United States Patent [19]

White et al.

[11] Patent Number: 5,591,102

[45] Date of Patent: Jan. 7, 1997

[54] APPARATUS AND METHOD FOR CONTROLLING A MANUAL-AUTOMATIC TRANSMISSION AFTER A POWER RESET

[75] Inventors: Gregory R. White, Columbus; Bryan S. Gatewood, Westport; Mark L. Wilson, Columbus, all of Ind.; Peter L. Griffen, Richmond, United Kingdom; Richard E. Kleine; Larry R. Webber, both of Columbus, Ind.

[73] Assignee: Cummins Engine Company, Inc., Columbus, Ind.

[21] Appl. No.: 473,721

[22] Filed: Jun. 7, 1995

[51] Int. Cl.$^6$ ............................................. B60K 41/04
[52] U.S. Cl. ........................ 477/107; 477/115; 477/906; 74/335
[58] Field of Search .................... 477/107, 125, 477/906, 115, 121, 143; 74/335; 364/424.1

[56] References Cited

U.S. PATENT DOCUMENTS

| | | |
|---|---|---|
| 3,732,755 | 5/1973 | Beig et al. . |
| 4,598,374 | 7/1986 | Klatt . |
| 4,635,508 | 1/1987 | Tatsumi . |
| 4,648,291 | 3/1987 | Klatt et al. . |
| 4,685,548 | 8/1987 | Holtermann et al. . |
| 4,698,762 | 10/1987 | Moriya et al. . |
| 4,702,127 | 10/1987 | Cote . |
| 4,713,764 | 12/1987 | Klatt . |
| 4,722,248 | 2/1988 | Braun . |
| 4,823,646 | 4/1989 | Yoshimura et al. . |
| 4,890,515 | 1/1990 | Taniguchi et al. . |
| 4,892,014 | 1/1990 | Morell et al. . |
| 5,043,895 | 8/1991 | Hattori et al. . |
| 5,047,935 | 9/1991 | Kashihara . |
| 5,047,936 | 9/1991 | Ishii et al. . |
| 5,060,541 | 10/1991 | Shimanaka . |
| 5,063,511 | 11/1991 | Mack et al. . |
| 5,079,973 | 1/1992 | Ookubo et al. . |
| 5,089,965 | 2/1992 | Braun . |
| 5,090,269 | 2/1992 | Ohtsuka et al. . |
| 5,095,774 | 5/1992 | Takahashi et al. ............. 477/906 X |
| 5,117,710 | 6/1992 | Asano et al. . |
| 5,117,711 | 6/1992 | Iizuka . |
| 5,150,297 | 9/1992 | Daubenmier et al. . |
| 5,157,607 | 10/1992 | Stainton et al. . |
| 5,167,311 | 12/1992 | Satoh et al. . |
| 5,182,969 | 2/1993 | Goto et al. . |
| 5,184,301 | 2/1993 | Stasell . |
| 5,365,437 | 11/1994 | Cunningham et al. ............. 364/424.1 |
| 5,401,223 | 3/1995 | White et al. ................. 477/906 X |
| 5,442,550 | 8/1995 | Tasky et al. ................. 364/424.1 |
| 5,460,581 | 10/1995 | Ueda ........................ 477/406 X |
| 5,461,563 | 10/1995 | Mimura ..................... 364/424.1 |
| 5,498,195 | 3/1996 | White et al. ............... 364/424.1 X |
| 5,499,952 | 3/1996 | Huber et al. ................ 477/906 X |

FOREIGN PATENT DOCUMENTS

| | | |
|---|---|---|
| 0384413A1 | 2/1990 | European Pat. Off. . |
| 0466036A1 | 7/1991 | European Pat. Off. . |
| WO94/21484 | 9/1994 | WIPO . |

*Primary Examiner*—Charles A. Marmor
*Assistant Examiner*—Peter Kwon
*Attorney, Agent, or Firm*—Woodard, Emhardt, Naughton Moriarty & McNett

[57] ABSTRACT

An apparatus and method of electronically controlling a manual/automatic transmission after a power reset is provided. Within a predetermined time period after a power reset, the current commanded transmission gear is held, or alternatively the highest of the electronically selectable gears is commanded, until an accurate determination of the vehicle speed can be made. If the vehicle speed is thereafter determined to be below a minimum vehicle speed value, the transmission is commanded to the neutral position, or alternatively, the lowest of the electronically selectable gears is commanded. If the vehicle speed is above the minimum vehicle speed value, or alternatively, above a maximum vehicle speed value, then the transmission is commanded to the highest of the electronically selectable gears. In either case, further electronic shifts are inhibited for a predetermined time period after recovery from the power reset is accomplished.

32 Claims, 9 Drawing Sheets

APPARATUS AND METHOD FOR CONTROLLING A MANUAL-AUTOMATIC TRANSMISSION AFTER A POWER RESET

FIELD OF THE INVENTION

The present invention relates to electronically controlled transmissions used in conjunction with internal combustion engine powered vehicles, and more specifically to a transmission/engine combination wherein the transmission is a combination manual and automatic transmission.

BACKGROUND OF THE INVENTION

Fully automatic transmission systems, both for heavy duty vehicles such as heavy duty trucks, and for automobiles, that sense throttle openings or position, vehicle speed, engine speed and the like, and automatically shift the vehicle transmission in accordance therewith, are well known in the prior art. Such fully automatic gear change transmission systems include automated transmissions wherein pressurized fluid is utilized to frictionally engage one or more members to other members or to a ground to achieve a selected gear ratio as well as automated mechanical transmissions utilizing electronic and/or pneumatic logic and actuators to engage and disengage mechanical (i.e., positive) clutches to achieve a desired gear ratio. Semi-automatic or manual-automatic transmission systems utilizing electronic control units that sense throttle position, engage speed, input shaft speed, output shaft and/or vehicle speed, and utilize automatically controlled fuel throttle devices, gear shifting devices, and/or master clutch operating devices to substantially automatically implement operator selected transmission ratio changes are also known in the prior art.

While such semi-automatic mechanical transmission systems are very well received, as they are somewhat less expensive than a fully automatic transmission systems, allow manual clutch control for low speed operation, and/or do not require automatic selection of the operating gear ratio, they may be too expensive for certain applications as a relatively large number of sensors and automatically controllable actuators, such as a master clutch and/or a fuel throttle device actuator, are required to be provided, installed, and maintained. However, with modern electronic controls for heavy duty truck engines, the majority, if not all, of the sensors are already present for providing feedback relating to engine speed, vehicle speed, throttle position, etc. Thus, an implementation of a semi-automatic transmission or manual-automatic transmission can be achieved with minor modifications to the hardware, particularly those vehicles including an electronic engine controller. Such a system is disclosed in co-pending application Ser. No. 08/108,483. Such systems require relatively sophisticated algorithms to provide reliable operation particularly with respect to the upshift and downshift of the automatically controlled gear ratios of the manual-automatic transmission.

If power is inadvertently removed or the engine control electronics experience an abnormal condition which causes a power reset, it is desirable to engage the transmission in a gear once the reset has been initiated so that the driver does not have to attempt to manually engage a transmission gear after the reset occurs. The control algorithm that forms a part of the present invention provides a highly reliable mechanism for commanding the manual-automatic transmission to the gear most likely achievable after an abnormal power up or reset condition has occurred.

SUMMARY OF THE INVENTION

In accordance with one aspect of the present invention, a method of electronically controlling a manual/automatic transmission after an electrical power reset in a vehicle having an engine engageable to the transmission and means for sensing vehicle speed, wherein the transmission includes both manually and electronically selectable gears and an electronically selectable neutral position, comprises the steps of: (1) maintaining engagement of the gear commanded prior to the power reset for a first predetermined time period; (2) performing steps (3)–(7) after the first predetermined time period elapses; (3) sensing vehicle speed; (4) commanding neutral position if the vehicle speed is less than a first predetermined vehicle speed; (5) commanding the highest of the electronically selectable gears if the vehicle speed is above a second predetermined vehicle speed and the engine is not engaged to either to the two highest electronically selectable gears; (6) sensing vehicle speed; and (7) performing steps (5)–(6) until a second predetermined time period elapses.

In accordance with a further aspect of the present invention, a method of electronically controlling a manual/automatic transmission after an electrical power reset in a vehicle having an engine engageable to the transmission and means for sensing vehicle speed, wherein the transmission includes both manually and electronically selectable gears and an electronically selectable neutral position, comprises the steps of: (1) commanding the highest of the electronically selectable transmission gears; (2) maintaining the transmission gear commanded in step (1) for a first predetermined time period; (3) performing steps (4)–(7) after the first predetermined time period elapses; (4) sensing vehicle speed; (5) commanding the lowest of the electronically selectable gears if the vehicle speed is less than a predetermined vehicle speed; (6) commanding the highest of the electronically selectable gears if the vehicle speed is above the predetermined vehicle speed; and (7) inhibiting auto electronic shifts until a second predetermined time period elapses.

In accordance with yet another aspect of the present invention, a control device for use with a motor vehicle having an engine and a manual/automatic transmission including a gear selection input and further having a manual gear selection mode of operation and an automatic gear shift mode of operation including a plurality of electronically selectable gears and a neutral position, comprises means for sensing vehicle speed and providing a vehicle speed signal corresponding thereto; means for sensing engine speed and providing an engine speed signal corresponding thereto; and processor means for controlling the transmission after a power reset, the processor means having a first input for receiving the vehicle speed signal, a second input for receiving the engine speed signal and an output connected to the gear selection input. The processor means is responsive to the power reset to provide a gear selection signal to the gear selection input to maintain engagement of the gear commanded prior to the occurrence of said power reset. The processor means is further responsive to the vehicle speed signal, after a first predetermined time period has elapsed since the power reset, to provide a gear selection signal to the gear selection input to command one of the neutral position if the vehicle speed is less than a first predetermined vehicle speed, and the highest of the electronically selectable gears if a vehicle speed in excess of a second predetermined vehicle speed level is detected before a second predetermined time period elapses, and if the ratio of the engine speed to the vehicle speed is within a predetermined range.

In accordance with yet a further aspect of the present invention, a control device for use with a motor vehicle having an engine and a manual/automatic transmission including a gear selection input and further having a manual gear selection mode of operation and an automatic gear shift mode of operation including a plurality of electronically selectable gears and a neutral position, comprises means for sensing vehicle speed and providing a vehicle speed signal corresponding thereto; and processor means for controlling the transmission after a power reset, the processor means having a first input for receiving the vehicle speed signal and an output connected to the gear selection input. The processor means is responsive to the power reset to provide a signal to the gear selection input to command the highest of the electronically selectable gears. The processor means is further responsive to the vehicle speed signal, after a first predetermined time period has elapsed since the power reset, to provide a signal to the gear selection input to command one of the lowest of the electronically selectable gears if the vehicle speed is less than a predetermined vehicle speed, and the highest of the electronically selectable gears if the vehicle speed is in excess of the predetermined vehicle speed level.

One object of the present invention is to provide a system and method wherein the current transmission gear of an electronically controlled transmission is held, or alternatively, the highest of the electronically selectable gears is commanded, after a first predetermined time period has elapsed since the occurrence of a power reset.

Another object of the present invention is to command the transmission to the neutral position, or alternatively, to the lowest of the electronically selectable gears, after the expiration of the first predetermined time period, if the vehicle speed is below a minimum vehicle speed value.

Yet another object of the present invention is to command the transmission to the highest of the electronically selectable gears, after the expiration of the first predetermined time period, if the vehicle speed is greater than or equal to the minimum vehicle speed value, or alternatively, greater than or equal to a maximum vehicle speed value.

A further object of the present invention is to maintain engagement of the currently commanded gear, after initial power reset recovery is accomplished at the expiration of the first predetermined time period, for a second predetermined time period, and to command the highest of the electronically selectable gears if the vehicle speed exceeds the minimum vehicle speed value, or alternatively, the maximum vehicle speed value, within the second predetermined time period.

Still a further aspect of the present invention is to monitor the status of vehicle speed, engine speed and solenoid faults, and command appropriate transmission gears in accordance with the fault condition detected.

These and other objects of the present invention will become more apparent from the following description of the preferred embodiment.

DESCRIPTION OF THE PREFERRED EMBODIMENT

Figure 1:
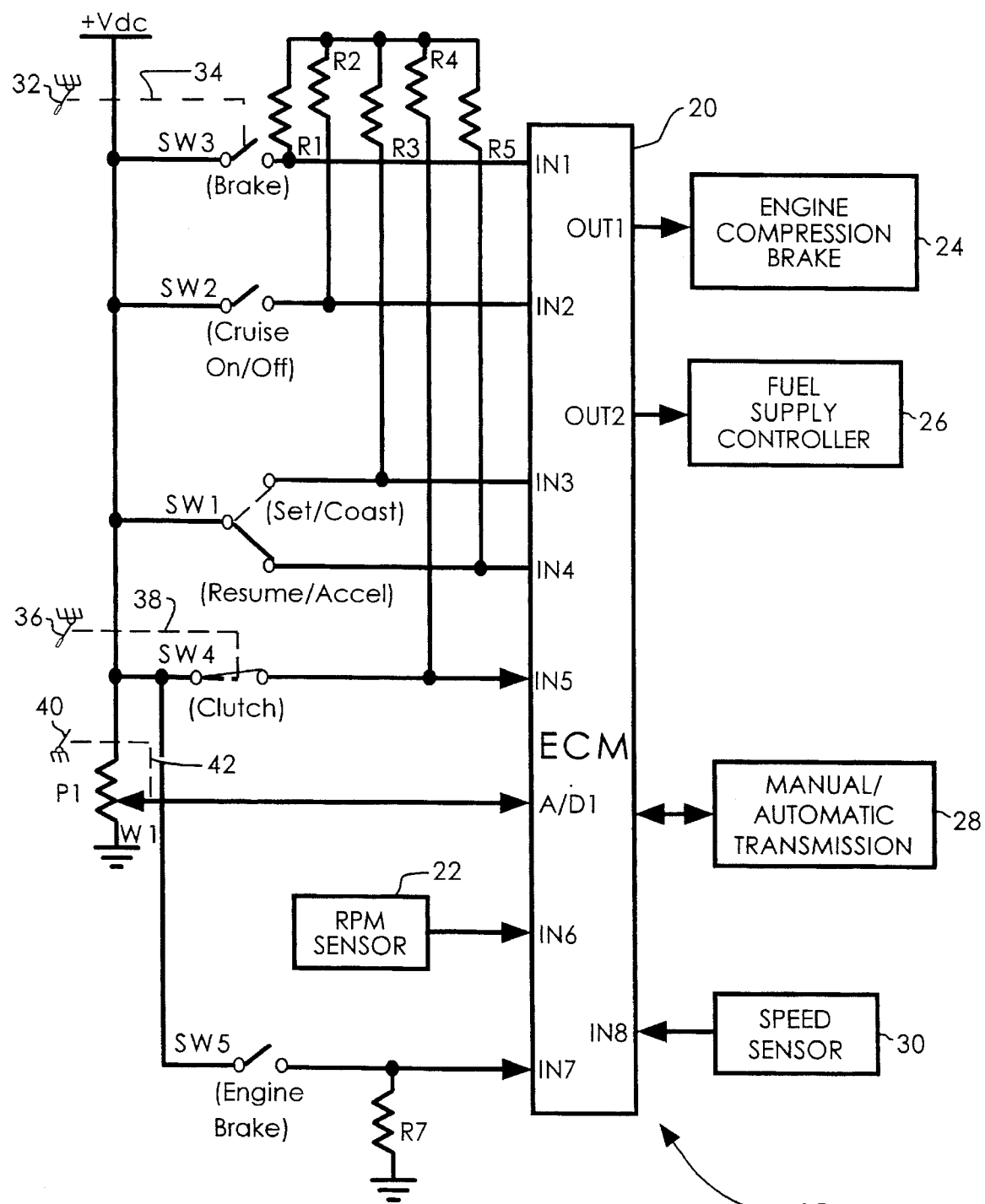
FIG. 1 is a diagrammatic illustration of an electronic controller consistent with the teachings of the present invention.

For the purposes of prompting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

System Hardware

Referring to FIG. 1, a diagrammatic illustration of a control system 15 according to the present invention is shown. The control system 15 includes as its central component electronic control module (ECM) 20. ECM 20 is a microcomputer including a microprocessor having memory including ROM and RAM and a plurality of inputs and outputs (I/O) in addition to interface circuits for I/O interfacing. ECM 20 may further include EPROM, EEPROM, Flash PROM and any other reusable type of read-only-memory known to those skilled in the art. The input signals supplied to ECM 20 are produced by various switches and sensors which respond to operating conditions of the engine and vehicle, and inputs from the driver.

Switches SW1 and SW2 are mounted in the driver's cab or driver compartment and provide the driver with a means for turning the cruise control functions on and off, via switch SW2, and for establishing a desired cruise speed via switch SW1, as well as permitting the vehicle to coast without cruise control operation. Switch SW1 also provides input signals to activate resume/acceleration features well known in the art of cruise control systems. Switch SW2 enables cruise control operation while switch SW1 is used to activate the operational modes of the cruise control system built into the software of ECM 20. Switch SW1 is a momentary center-off SPDT switch. The set/coast cruise control function is activated by shorting input IN3 of ECM 20 to logic high voltage, or $+V_{DC}$. This is accomplished by closing switch SW1 and connecting $+V_{DC}$ to the signal path connected to resistor R3 and input IN3. In the alternative, when switch SW1 is actuated to connect input IN4 and resistor R5 with $+V_{DC}$, input IN4 is raised to a logic high and the ECM 20 is informed that the driver is actuating the resume or acceleration features of the cruise control system.

Switch SW4 provides an input signal to IN5 of ECM 20 indicative of the operational state of the vehicle clutch. The vehicle clutch is activated by clutch pedal 36. A mechanical linkage 38 interconnects switch SW4 with pedal 36 so that switch SW4 is opened when the driver or operator depresses clutch pedal 36 thereby mechanically disengaging the engine of the vehicle from the transmission of the vehicle. Switch SW4 is normally closed, thus when the clutch pedal 36 is released, a $+V_{DC}$ signal is supplied to input IN5 of ECM 20. When switch SW4 is opened, as a result of clutch pedal 36 being depressed, switch SW4 opens and resistor R4 pulls the input IN5 to logic low or ground.

Switch SW5 is a driver-operated switch which provides an input signal to the ECM 20 regarding the operating state (on/off) of the engine compression brake desired by the driver. Switch SW5 is a normally open switch which, when closed, supplied a high logic signal level to input IN7 of ECM 20 indicating engine brake operation is desired. When switch SW5 is open, resistor R7 pulls input IN7 to logic low or ground, thereby providing ECM 20 with a logic low signal corresponding to a driver request to disable or discontinue engine brake operation.

Accelerator pedal 40 is mechanically coupled, via linkage 42 to the wiper W1 of potentiometer P1. The wiper W1 is connected to an analog to digital (A/D) converter input A/D1 of ECM 20. The position of accelerator pedal 40 corresponds directly to the voltage present on wiper W1. Although potentiometer P1 is connected at one terminal to $+V_{DC}$ and at the other terminal to ground, the voltage present on wiper W1 ranges between a window of (ground+deltav1) and $(+V_{DC}$–deltav2), where deltav1 and deltav2 represent a voltage offsets. In this application, when accelerator pedal 40 is in the throttle closed or non-depressed position, the voltage present on wiper W1 is below a predetermined voltage corresponding to a throttle closed position. If the wiper W1 voltage is above a predetermined voltage, it is considered by the ECM 20 to be an indicator that the throttle is open. Throttle control by the operator, including cruise control operation, may be inhibited by the ECM 20 and thereafter controlled by the ECM 20.

Output OUT1 of ECM 20 supplies a signal to engine compression brake 24 which is a part of the engine of the vehicle (not shown), to provide engine compression braking operation as is well known in the operation of heavy duty trucks.

Output OUT2 of ECM 20 provides continuously variable signals which control the fuel supply controller 26. The continuously variable signals supplied to fuel supply controller 26 enable ECM 20 to fuel the engine of the vehicle to any particular rpm (revolutions per minute) desired. Under normal vehicle operation, the throttle is controlled by the driver via the accelerator pedal 40. In this normal mode of operation, the fuel supply controller 26 is actuated in response to driver demand. However, throttle control by the driver is capable of being inhibited by the ECM 20 so that the ECM 20 may control the fuel supply controller 26 to fuel the engine in certain situations to be more fully discussed hereinafter. Fuel supply controller may take the form of a fuel shut-off valve, fuel injectors or other fueling mechanisms responsive to electronic signals for controlling fuel supply rates to an engine.

Speed sensor 30 and RPM sensor 22 supply signals to ECM 20 indicative of the vehicle speed and engine speed, respectively. RPM sensor 22 supplies a pulse train signal to input IN6 of ECM 20. The pulse train signal supplied to input IN6 is monitored by ECM 20 to determine engine RPM speed. Similarly, the speed sensor 30, which detects tail shaft or drive shaft rotational speed, provides a similar pulse train signal to input IN8 of ECM 20 wherein the frequency of the pulse train delivered to ECM 20 indicates the speed of rotation of the output shaft of the transmission 28 or the drive shaft of the vehicle drive train.

The manual automatic transmission 28 is connected via various signal path lines to ECM 20. The interface between ECM 20 and manual/automatic transmission (MAT) 28 is more specifically shown for two different transmission embodiments in FIGS. 2 and 3, respectively. The I/O interface between ECM 20 and MAT 52 shown in FIG. 2 includes a gear engagement status logic feedback signal supplied to input IN10 as well as an automatic shift-mode request switch SW6 that supplies a logic signal to input IN11 indicating whether automatic gear shifting operation may be requested. Switch SW6 is actuated in response to driver positioning of gearshift lever 50. Gear shift lever 50 is coupled to switch SW6 via actuator linkage 54. Resistor R6 maintains the logic signal present at input IN11 of ECM 20 at a logic high whenever normally open switch SW6 is not closed. When switch SW6 is closed, the logic signal present at input IN11 is at a logic low level. Gear selection logic signals supplied to outputs OUT3 and OUT4 of ECM 20 control the actuation of sixth gear and seventh gear solenoids 51 and 53 of the MAT 52 to thereby select six and seventh gears respectively. MAT 52 is a Spicer transmission Model No. AS125-7 manufactured by Spicer, a subsidiary of Dana Corporation.

The signal supplied from MAT 52 to input IN10 of ECM 20 is a logic signal indicating that MAT 52 is in a neutral (no gears engaged) operational state when the signal is at a logic low level. When the signal supplied to input IN10 of ECM 20 from MAT 52 is a logic high signal, an "in-gear" condition of operation of MAT 52 is confirmed. The signal supplied to input IN10 does not indicate which automatically selectable gear ratio operation state is currently engaged. Nevertheless, ECM 20 is aware of the logic output levels at outputs OUT3 and OUT4. Thus, ECM 20 can determine whether MAT 52 was attempted to be placed into sixth gear automatic operation state or seventh gear automatic operation state by the status of outputs OUT3 and OUT4. Whether MAT 52 actually engaged six or seventh gear, however, must be determined via a gear confirmation, or gear verification, process. Automatic gear shifting thus occurs in the "top two" gears according to shift algorithms contained within the ECM 20.

Figure 4:
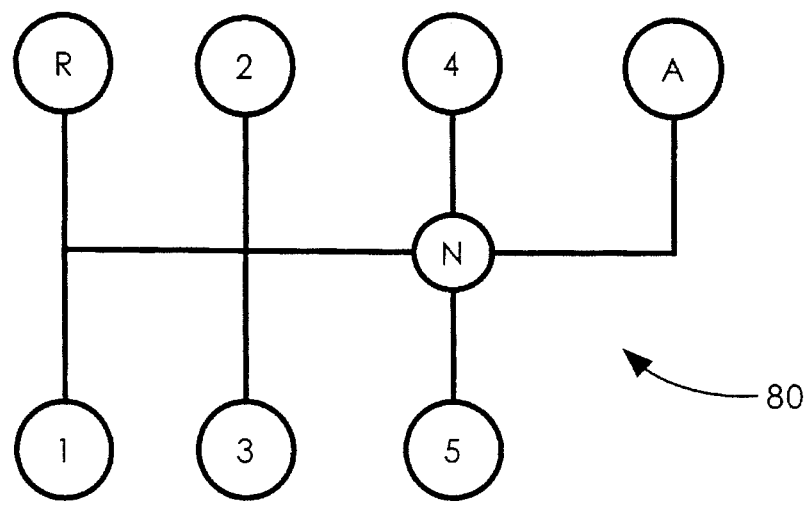
FIG. 4 is a diagrammatic illustration of the shift pattern for a Dana Spicer 7-speed heavy duty truck transmission.

Switch SW6 is actuated only when shift lever 50 is placed into the automatic operation mode position depicted by the shift position A in FIG. 4 wherein automatic actuation of sixth and seventh gear is requested by the driver of the vehicle. The other shift lever positions of FIG. 4 correspond to the reverse, first, second, third, fourth, and fifth gear ratio operation states which are manually selectable or engageable by the driver.

Figure 3:
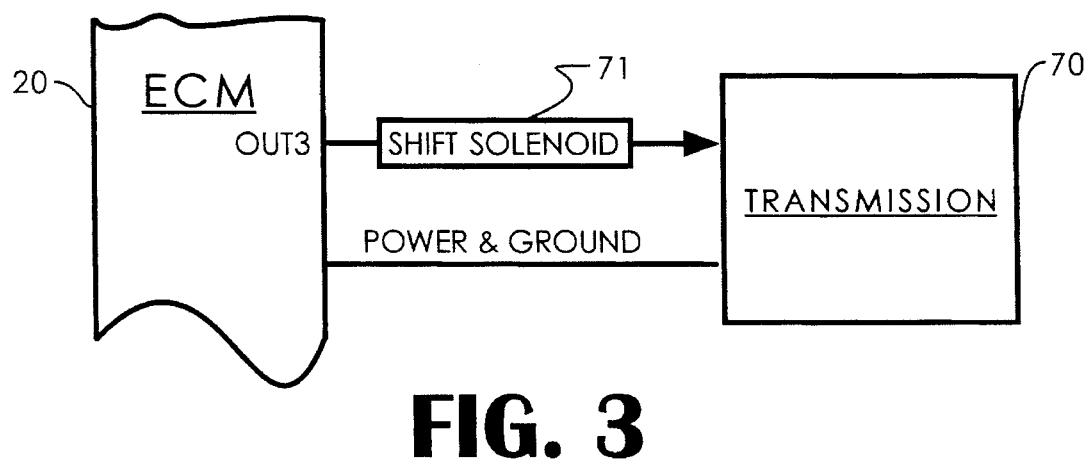
FIG. 3 is another embodiment of the control interface between engine control module and transmission of FIG. 1.
Figure 5:
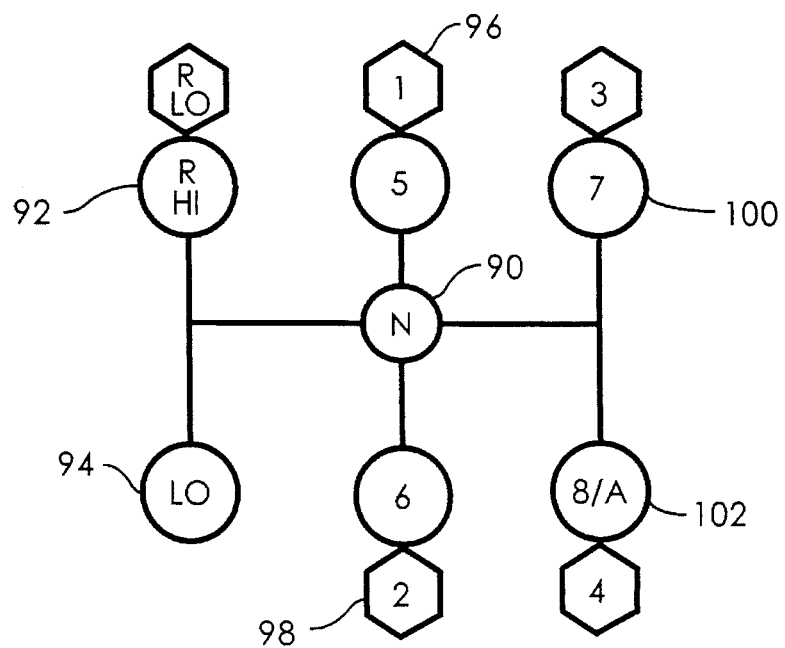
FIG. 5 is a diagrammatic illustration of an Eaton Fuller heavy duty truck transmission shift pattern.

In an alternative transmission embodiment shown in FIG. 3, ECM 20 is electronically connected to and interfaced with MAT 70, an Eaton/Fuller, Inc. transmission model RTT 12609A. The only I/O interface signal required between MAT 70 and ECM 20 is an output signal from output OUT3 supplied to the splitter gear box electro-pneumatic solenoid 71 of MAT 70. The splitter gear box of MAT 70 provides an overdrive gear ratio when the MAT 70 is in the highest speed gear operation state. This is further illustrated in FIG. 5 by the gearshift pattern shown which corresponds to the Eaton/

Fuller MAT 70. Neutral is found at position 90. Reverse gears are selectable at position 92 and forward gear ratio operational states that are manually selectable are shown at positions 94, 96, 98, 100, and 103. Once the driver has shifted manually through the gears according to the shift order of low, one, two, three, four, five, six, seven, and finally shifted the MAT 70 into the manual gearshift position labeled 8/A, the automatic shifting function of the ECM software is activated to supply a gear request signal at output OUT3 of ECM 20 to shift back and forth between high split and low split to thereby provide an overdrive final drive ratio or higher speed capability gear ratio for MAT 70. Thus, at location 102 the position labeled 8/A is the last manually selected gear position during the manual gear shifting phase of vehicle operation prior to the engagement or selection of automatic shift-mode operation.

The Eaton/Fuller embodiment of the present invention does not require switch SW6 since the auto-shift mode is detected, through software, by comparing engine speed and tailshaft speed. If the ratio of engine speed to tailshaft speed is within a predetermined ratio range, ECM 20 recognizes that the driver has shifted MAT 70 into position 102 in FIG. 5. Thereafter, until the ratio of engine speed to tailshaft speed falls outside the predetermined ratio range, ECM 20 controls the "top two" gears of MAT 70 according to shift algorithms forming a part of the ECM 20 software.

Even though the splitter does not have a true neutral state, there is a point where the splitter is neither in low or high split (ie. disengaged). Disengagement is detected if the engine speed, detected at input IN6 of the ECM 20, is outside of a disengagement window defined as a predetermined delta1 RPM level above or below the tailshaft speed, detected at input IN8 of the ECM 20. Typically, delta1 is approximately 150 RPM, but the present invention contemplates delta1 RPM levels between approximately 50 RPM and 500 RPM. "Neutral" in the MAT 70 application is thus detected by software.

Although the interface between MAT 52 and ECM 20 versus the interface between MAT 70 and ECM 20 are substantially different, the operational features are significantly similar when either MAT 52 or 70 is placed into the automatic shift-mode operation state wherein the "top two" final drive gear ratio operation states are automatically selected by the ECM 20. Two electro-pneumatic solenoid valves (not shown) are actuated by logic signals supplied to output OUT3 and output OUT4 of ECM 20 in FIG. 2 to engage sixth gear, seventh gear or neutral operation mode of MAT 52. Pressurized air and air cylinder(s) (not shown) within the MAT 52 or 70 supply the automatic shift mode gear engaging action according to the position of the solenoid valve(s).

One electro-pneumatic solenoid valve is required to operate the splitter of MAT 70 shown in FIG. 3. Thus, the signal supplied to output OUT3 actuates an electro-pneumatic solenoid valve (not shown) which actuates the splitter of MAT 70. The embodiments shown in FIG. 2 and FIG. 3 both include power and ground signals supplied via signal path 58 between the ECM 20 and the MATS 52 and 70.

Automatic Gear Shifting

Figure 2:
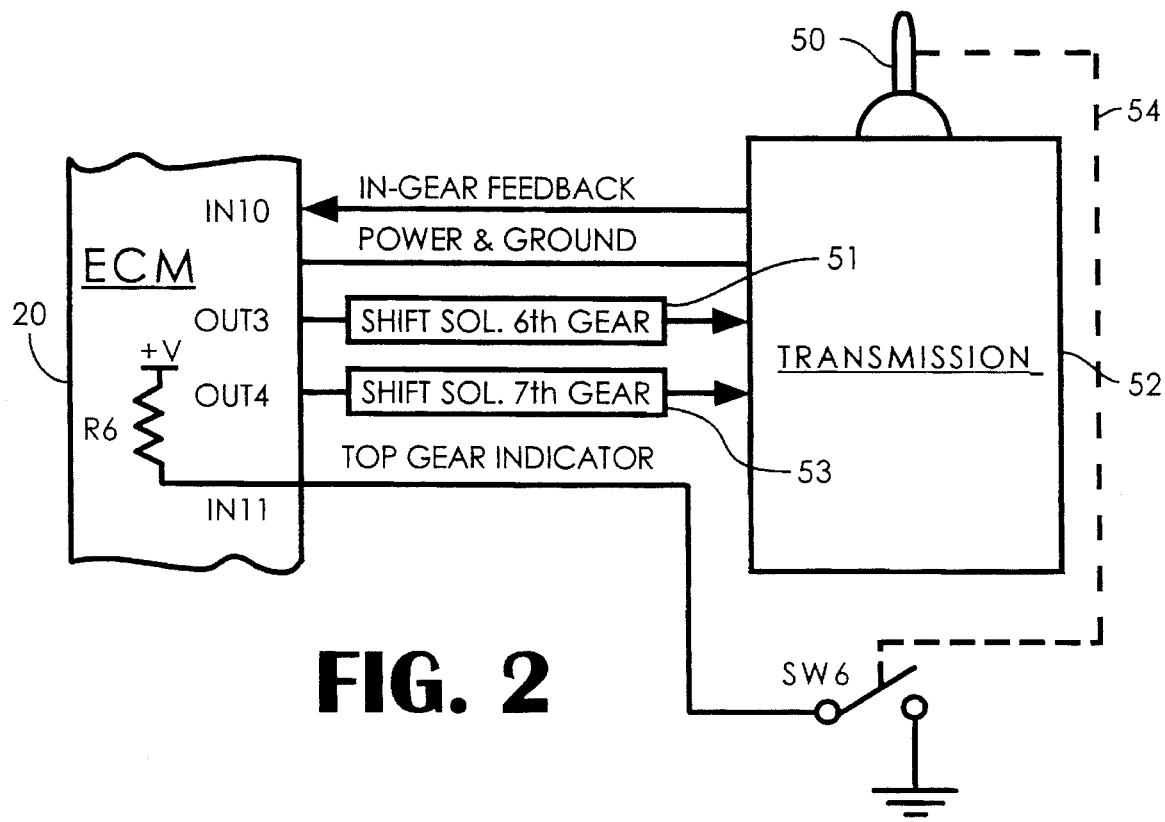
FIG. 2 is a diagrammatic illustration of one embodiment of the engine control module to manual/automatic transmission control interface.
Figure 6:
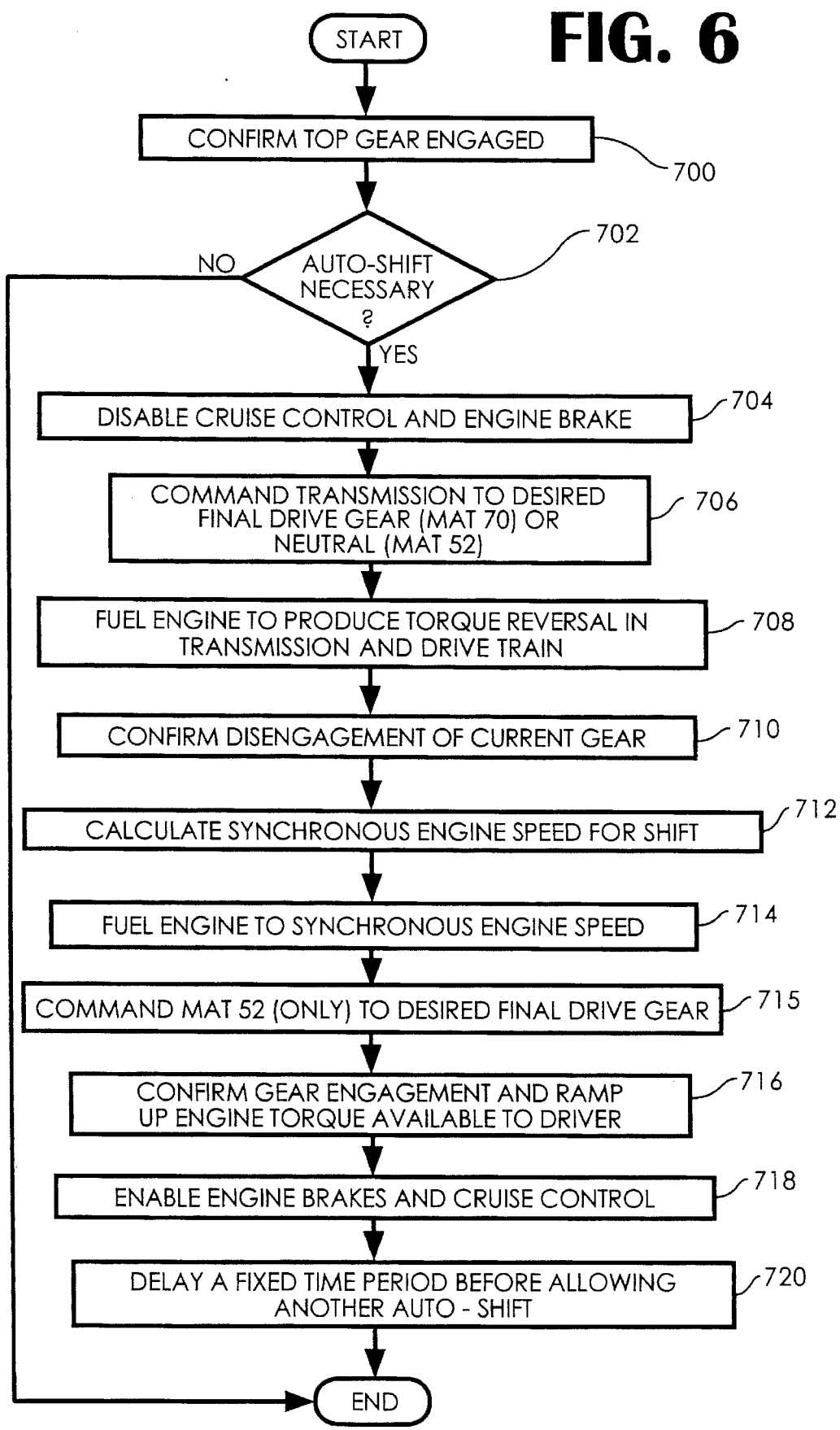
FIG. 6 is a flowchart of an auto-shift sequence according to the present invention.

Operationally speaking, an auto-shift to be performed in the top two gears of the system shown in FIG. 1 and FIG. 2 or FIG. 3 includes the following sequence of events (and is reflected in the flowchart of FIG. 6): (1) confirm that one of the top two gears is engaged, (step 700), (2) determine if an auto-shift is necessary, (step 702), (3) disable cruise control and engine brakes if active, (step 704), (4) command the transmission shift solenoid (or solenoids) to the requested gear (MAT 70), or neutral (MAT 52), (step 760), (5) fuel the engine to produce a torque reversal in the transmission and drive train, (step 708), (6) confirm disengagement of the current gear, (step 710), (7) calculate synchronous engine speed to engage desired auto-shift gear ratio operation state, (step 712), (8) fuel engine to achieve synchronous engine speed, (step 714), (9) command the transmission solenoid to the final drive gear (MAT 52 only), (step 915), (10) confirm gear engagement, (step 716), (11) ramp the engine torque available to the driver, (step 716), (12) return engine brakes and cruise control to their operational state prior to the auto-shift sequence initiation, (step 718), and (13) delay a fixed period of time before attempting another auto-shift (step 720).

A number of operational factors or conditions are monitored to determine whether to initiate or inhibit an auto-shift sequence. The ECM 20 continuously monitors the system inputs numerous times a second to determine whether or not an auto-shift sequence can be initiated. A preferred repetition time span is approximately 96 milliseconds, although other repetition time intervals are contemplated; that is the ECM 20 should determine whether an auto-shift condition is present and whether an auto-shift should be initiated every 96 milliseconds. An auto-shift is inhibited if any of the following conditions exist: (1) one of the top gears is not confirmed as engaged, which is a condition precedent for an automatic mode upshift or an automatic mode downshift, (2) vehicle speed is below a predetermined level, (3) the clutch pedal is depressed before or during the auto-shift process, (4) a shift delay has not elapsed since the previous auto-shift, and (5) other system faults which indicate to the ECM 20 that an automatic mode shift or auto-shift should not occur, such as speed sensor or RPM sensor failure, or other such hardware failures which prevent proper and safe operation of the auto-shift mode of operation. A manual-automatic transmission and engine control system as depicted in U.S. Pat. No. 5,401,223 to Gregory R. White, et al., provides a detailed description of typical considerations for determining when and whether to initiate or inhibit an auto-shift sequence, the contents of which are incorporated herein by reference.

Power Reset Recovery

If power to ECM 20 is inadvertently removed, or the engine control electronics otherwise experience an abnormal condition which causes a power reset, it is desirable to engage the transmission in a gear once reset has been completed so that the driver does not have to manually attempt to engage the transmission after reset occurs. In accordance with a control algorithm that forms a part of the present invention, the currently commanded transmission gear is held, or alternatively the highest of the automatically selectable gears is commanded, upon a power reset until an accurate measurement of the vehicle speed, engine speed and gear ratio can be made. Thereafter, if the vehicle speed is below a predetermined value, the transmission is commanded to the neutral position, or alternatively to the lowest of the automatically selectable gears. If the vehicle speed is above the predetermined value, or alternatively above a second predetermined value, the transmission is commanded to the highest of the automatically selectable gears if certain gear ratio and engine speed conditions are met. Finally, the control algorithm continuously monitors certain fault conditions provided by the engine control system, as well as certain vehicle operating conditions, to further determine the proper gear to command if such a fault condition is active, or becomes active, during the execution of the control algorithm.

Figure 7A:
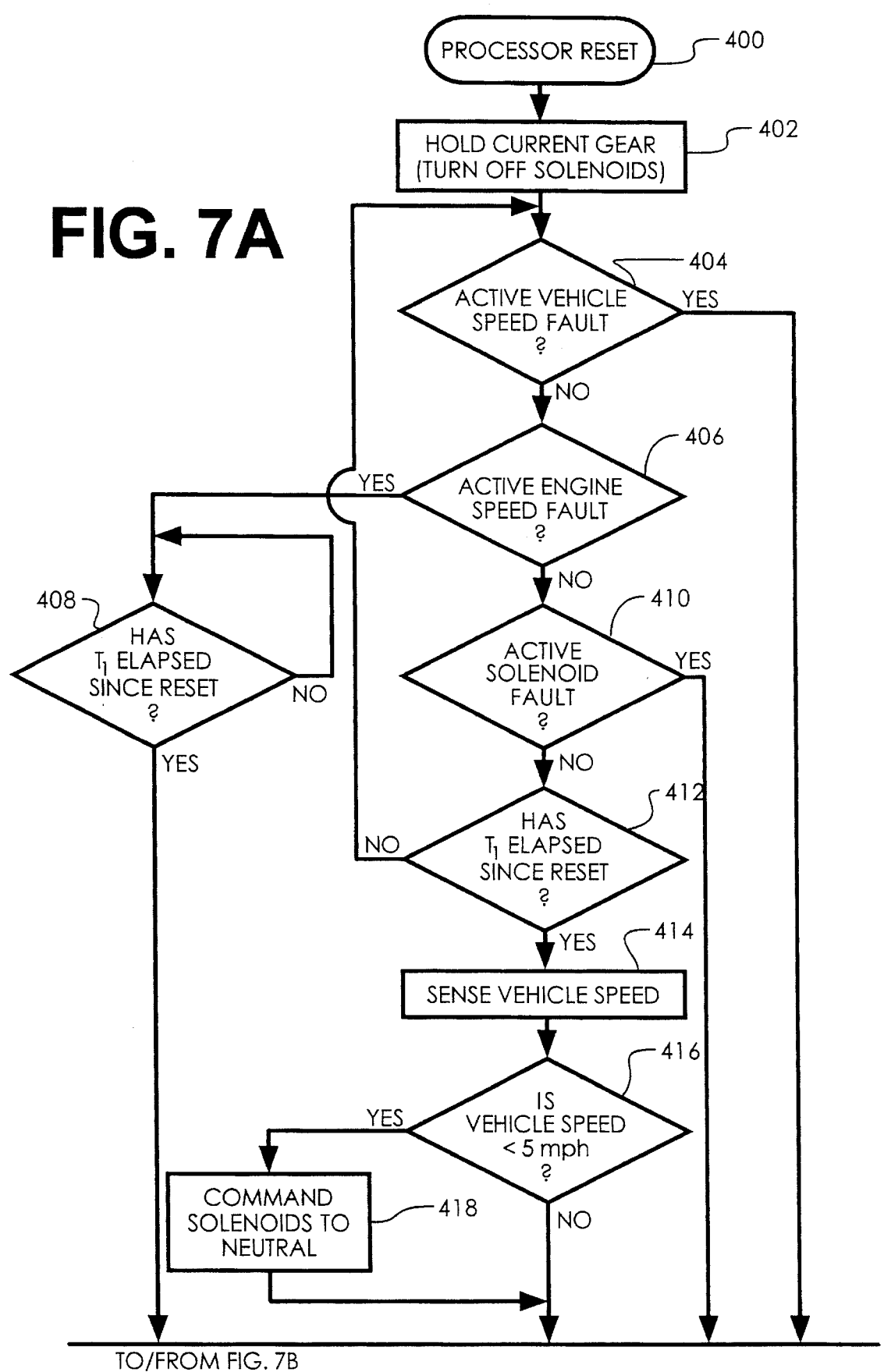
FIGS. 7A, 7B, and 7C describe one embodiment of a flowchart of an algorithm for commanding a gear after a power reset, in accordance with the present invention, in controlling the transmission embodiment of FIG. 2.
Figure 7B:
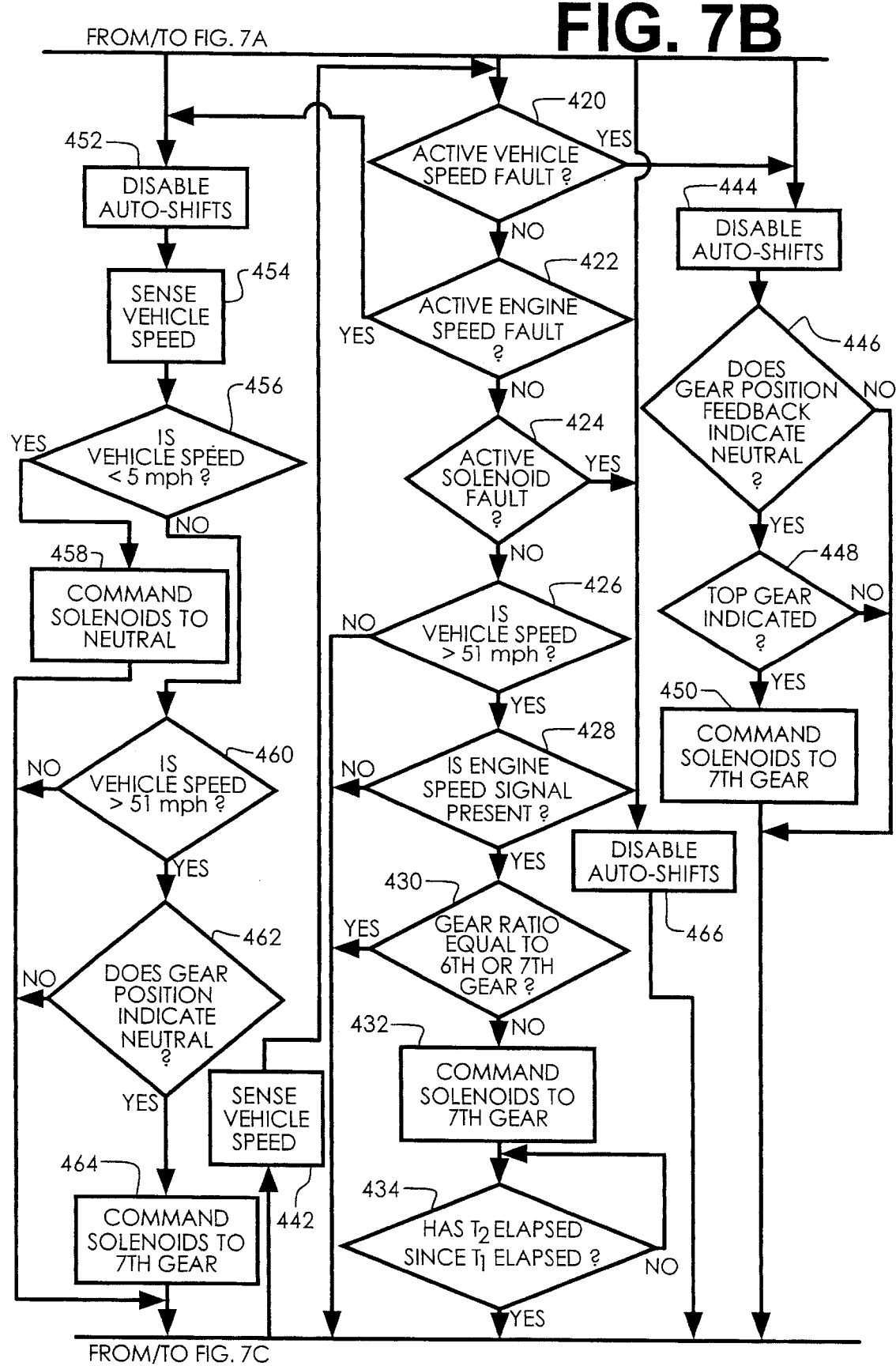
Figure 7C:
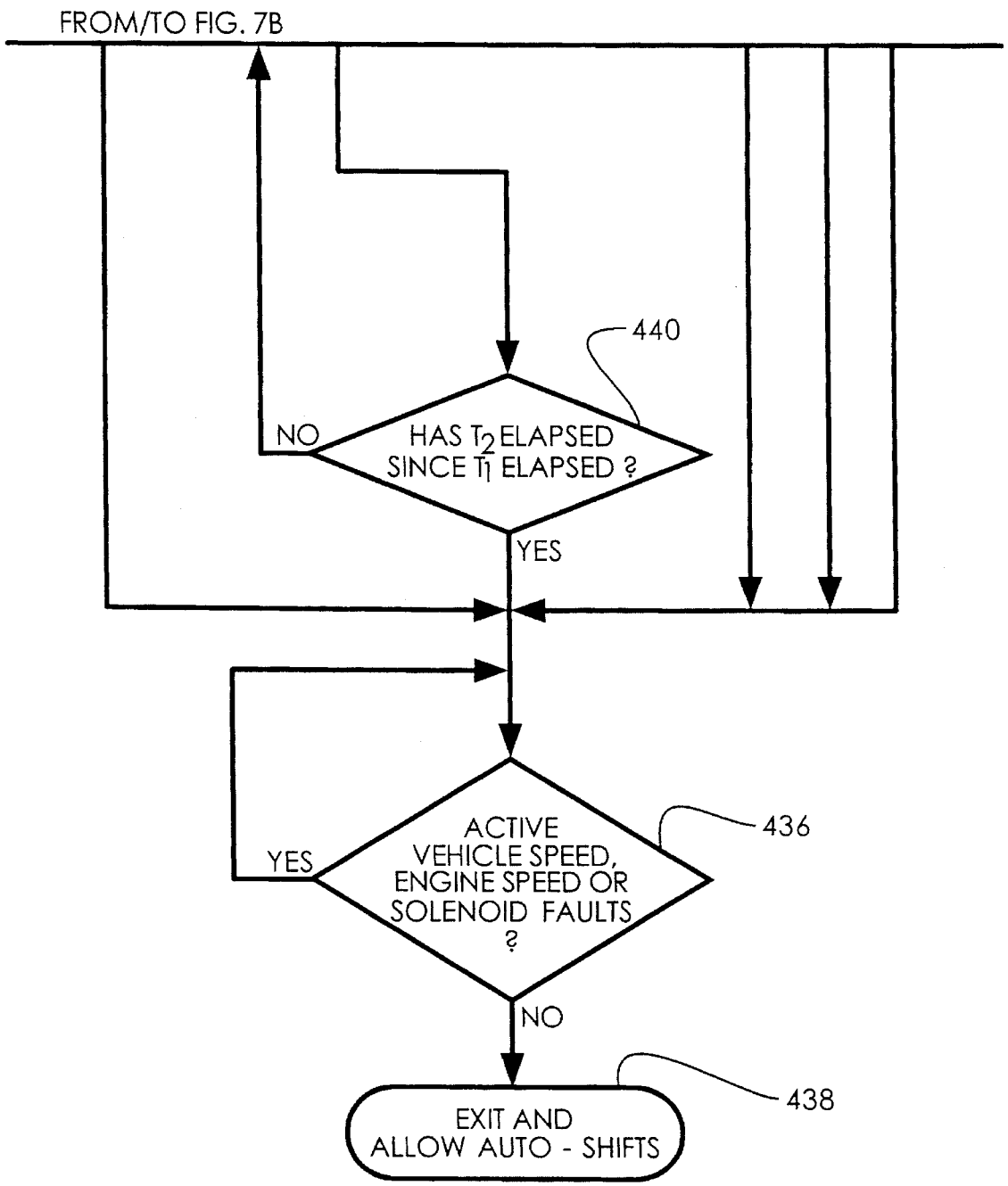

Referring now to FIGS. 7A, 7B, and 7C, a flowchart for a preferred algorithm for controlling recovery after a power reset, in accordance with the present invention, is shown. The algorithm of FIGS. 7A, 7B, and 7C implements concepts described herein via ECM 20 and is preferably used in controlling, for example, MAT 52 after a power reset. The algorithm begins at step 400 with a power reset. The power reset may occur due to any of a number of events which cause ECM 20 to undergo a power up sequence, or processor reset, including, for example, initial power up, abnormal electrical conditions, electrical system glitches and the like. After a power reset occurs at step 400, the gear commanded by ECM 20 prior to reset is held at step 402. With MAT 52, step 402 is accomplished by commanding both solenoids 51 and 53 to their "off" state. Typically, step 402 is executed within approximately 100 milliseconds of the power reset, although the present invention contemplates executing step 402 within the range of approximately 1 millisecond and 500 milliseconds of the power reset.

The algorithm continues at step 404 where the vehicle speed fault status is tested. A vehicle speed fault may occur for any of a number of events affecting the sensing and processing of the vehicle speed signal supplied via sensor 30 of FIG. 1, such as for example, sensor lost due to open or short circuit and/or vehicle speed signal not received by the ECM 20. If a vehicle speed fault is detected as being active at step 404, the algorithm continues at step 444. If a vehicle speed fault is detected as being inactive at step 404, the algorithm continues at step 406 where the engine speed fault is tested. An engine speed fault may occur, as with the vehicle speed fault, for any of a number of events affecting the sensing of engine speed via RPM sensor 22 of FIG. 1, such as for example, sensor lost due to open or short circuit and/or engine speed signal not received by the ECM 20. In any event, if an engine speed fault is detected as being active at step 406, the algorithm continues at step 408. If at step 408, a time period $T_1$ has elapsed since the power reset occurred at step 400, the algorithm continues at step 452. If $T_1$ has not elapsed since the power reset, the algorithm loops back to step 408. Typically, $T_1$ is set at approximately 1.7 seconds, although the present invention contemplates $T_1$ values of between approximately 1 millisecond and 5 seconds.

If the engine speed fault is detected as being inactive at step 406, the algorithm continues at step 410 where the solenoid fault status is tested. A solenoid fault may occur for any of a number of reasons including, for example, if either solenoid 51 or 53 is open circuited, short circuited, or unresponsive to commands from ECM 20. If a solenoid fault is detected as being active at step 408, the algorithm continues at step 466. If a solenoid fault is detected as being inactive at step 410, the algorithm continues at step 412. It should be pointed out that detection of the foregoing faults is accomplished via a diagnostics portion of the base ECM 20 software. The specific fault sensing techniques and/or particular faults tested are either commonly known, or are the subject of either an issued or pending patent assigned to the assignee of the present invention. The algorithms forming a part of the present invention thus act upon existing fault conditions which are made available via the base electronic engine control system.

If, at step 412, the time period $T_1$ has elapsed since the power reset occurred at step 400, the algorithm continues at step 414. If, however, $T_1$ has not elapsed since the power reset, the algorithm loops back to step 404. Thus, for the time period $T_1$ after a power reset, the algorithm maintains the transmission gear commanded prior to the reset and inhibits further electronically controlled shifts while monitoring vehicle speed, engine speed, and solenoid fault statuses.

After the time period $T_1$ has elapsed since the power reset occurred, the algorithm continues at step 414 where the vehicle speed is sensed via sensor 30 (FIG. 1). The time period $T_1$ is an important aspect of the present invention in that it allows a time delay after the occurrence of a power reset for the ECM 20 to determine an accurate vehicle speed. If the vehicle speed sensed at step 414 is less than a minimum vehicle speed at step 416, ECM 20 commands the transmission to the neutral position at step 418. If the vehicle speed is greater than or equal to the minimum vehicle speed at step 416, the algorithm continues at step 420. Typically, the minimum vehicle speed value is set at approximately 5 miles per hour, although the present invention contemplates minimum vehicle speed values of between 1 mile per hour and 50 miles per hour.

At step 420, the vehicle speed fault status is again tested. If a vehicle speed fault is active at step 420, then program execution continues at step 444. If a vehicle speed fault is not active at step 420, the engine speed fault status is tested at step 422. If an engine speed fault is active at step 422, program execution continues at step 452. If an engine speed fault is not active at step 422, the solenoid fault status is tested at step 424. If a solenoid fault is active at step 424, program execution continues at step 466. If a solenoid fault is not active at step 424, program execution continues at step 426.

At step 426, if the vehicle speed sensed at step 414 is greater than a maximum vehicle speed, then the algorithm continues at step 428. If the vehicle speed is less than or equal to the maximum vehicle speed at step 426, the algorithm continues at step 440. Typically, the maximum vehicle speed value is set at approximately 51 miles per hour, although the present invention contemplates maximum vehicle speed values of between 1 mile per hour and 100 miles per hour. At step 428, the engine speed signal is tested. If an engine speed signal is present, or in other words if a valid engine speed signal is being received by ECM 20 via sensor 22 (FIG. 1), then the algorithm continues at step 430. If an engine signal is not present at step 428, the algorithm continues at step 440. At step 430, the current gear ratio is tested to determined whether either of the electronically selectable gears are currently engaged. In computing the most recent gear ratio, ECM 20 computes a ratio of engine speed to vehicle speed (typically provided as the tailshaft speed). If this ratio is within a first range, then 7th gear is currently engaged. Similarly, if the calculated gear ratio is within a second range, then 6th gear is currently engaged. Finally, if the gear ratio is outside both the first and second ranges, then neither 6nor 7th gear is currently engaged. Typically, the first range (7th gear range) is between 0.9 and 1.1, while the second (6th gear range) is between 1.23 and 1.43. In any event, if either 6th or 7th gear is engaged at step 430, the algorithm continues at step 432.

If neither 6th nor 7th gear is engaged at step 430, then the highest of the electronically selectable gears (7th gear) is commanded by ECM 20 at step 432. Thus, after a time delay of $T_1$ (typically 1.7 seconds), neutral is commanded if the vehicle speed is less than a minimum vehicle speed value (typically 5 mph), and the highest of the electronically selectable gears (7th gear) is commanded if the vehicle speed is above a maximum vehicle speed value (typically 51 mph), an engine speed signal is present and neither 6th nor 7th gear is currently engaged. Program execution continues thereafter at step 434.

If, at step 434, the time period $T_2$ has elapsed since $T_1$ elapsed, the algorithm continues at step 436. If, at step 434, the time period $T_2$ has not elapsed since $T_1$ elapsed, the algorithm loops back to step 434. Thus, after the algorithm initially determines the appropriate transmission gear to either command or maintain after the time period $T_1$ expires, a delay period of $T_2$ is allowed to elapse. Typically, $T_2$ is set at approximately 3.5 seconds, although the present invention contemplates $T_2$ values of between 10 milliseconds and 10 seconds.

After $T_2$ has elapsed at step 434, program execution continues at step 436 where the vehicle speed, engine speed and solenoid fault statuses are tested. If any of these faults are active, the algorithm loops back to step 436 until all of these faults are cleared. If, and when, no such faults are active at step 436, the algorithm continues at step 440 where the algorithm is terminated (or alternatively returned to its calling routine) and further electronic shifts are thereafter allowed. If the vehicle speed is less than or equal to 51 mph at step 426, or a valid engine speed signal is not present at step 428, or the gear ratio is equal to either of the top two automatically selectable gears at step 430, program execution continues at step 440. If, at step 440, $T_2$ has elapsed since $T_1$ elapsed, the algorithm continues at step 436. If, however, $T_2$ has not elapsed since $T_1$ elapsed at step 440, vehicle speed is sensed at step 442 and the algorithm loops back to step 420. Thus, the time delay $T_2$ provides yet another important aspect of the present invention in that it provides ECM 20 with a time span of $T_2$ to determine an accurate engine speed and gear ratio while at the same time monitoring fault conditions and vehicle speed to determine whether the vehicle speed has increased sufficiently to warrant a command for 7th gear.

If, at either of steps 404 or 420, a vehicle speed fault is determined to be active, the algorithm continues at step 444 while all auto-shifts are disabled. The algorithm continues thereafter at step 446 where the gear position feedback indicator is tested (IN10 of FIG. 2). If, at step 446, the gear position feedback indicator indicates that one of the transmission gears is currently engaged, the algorithm continues at step 436. If, at step 446, the gear position feedback indicator indicates that the transmission is in the neutral position, the program continues at step 448 where the top gear indicator is tested (IN 11 of FIG. 2). If, at step 448, the top gear indicator indicates that the electronically selectable gears (6th and 7th gears) may not be requested, as previously described, the algorithm continues at step 436. If the top gear indicator indicates that the electronically selectable gears may be requested at step 448, the highest of the electronically selectable gears (7th gear) is commanded at step 450, and program execution continues thereafter at step 436. Thus, if a vehicle speed fault is detected at any time before both $T_1$ and $T_2$ elapse, 7th gear is commanded, after $T_1$ elapses, as long as the transmission is in the neutral position and the top gear indicates that the electronically selectable gears may be requested. Otherwise, engagement of the gear currently engaged is maintained. In either case, the gear is held, and further electronic shifts are inhibited, until the vehicle speed fault and any engine speed or solenoid faults are cleared (become inactive). Electronic (auto) shifts are thereafter allowed.

If, at step 422, an engine speed fault is determined to be active, as well as after $T_1$ elapses at step 408, the algorithm continues at step 452 where all auto-shifts are disabled. Program execution continues thereafter at step 454 where the vehicle speed is sensed. Thereafter, at step 456, if the vehicle speed sensed at step 454 is less than the minimum vehicle speed value (typically 5 mph), the neutral position is commanded at step 458. If the vehicle speed is greater than or equal to the minimum vehicle speed value at step 456, the vehicle speed sensed at step 454 is tested against the maximum vehicle speed value at step 460. If, at step 460, the vehicle speed is greater than the maximum vehicle speed value (typically 51 mph), the algorithm continues at step 462 where the status of the gear position feedback indicator is tested. If, at step 462, the gear position feedback indicator indicates that the transmission is in the neutral position, then the highest of the electronically selectable gears (7th gear) is commanded at step 464. If 7th gear is commanded at step 464, or if the neutral position was commanded at step 458, or if the vehicle speed is less than or equal to 51 mph at step 460, or if the gear position feedback indicator indicates neutral at step 462, the algorithm continues at step 436.

If, at either of steps 410 or 424, a solenoid fault was detected as being active, all auto shifts are disabled at step 466 and program execution continues thereafter at step 436 to hold the currently commanded gear since autoshifting with failed solenoids may result in failure to engage the transmission.

Figure 8A:
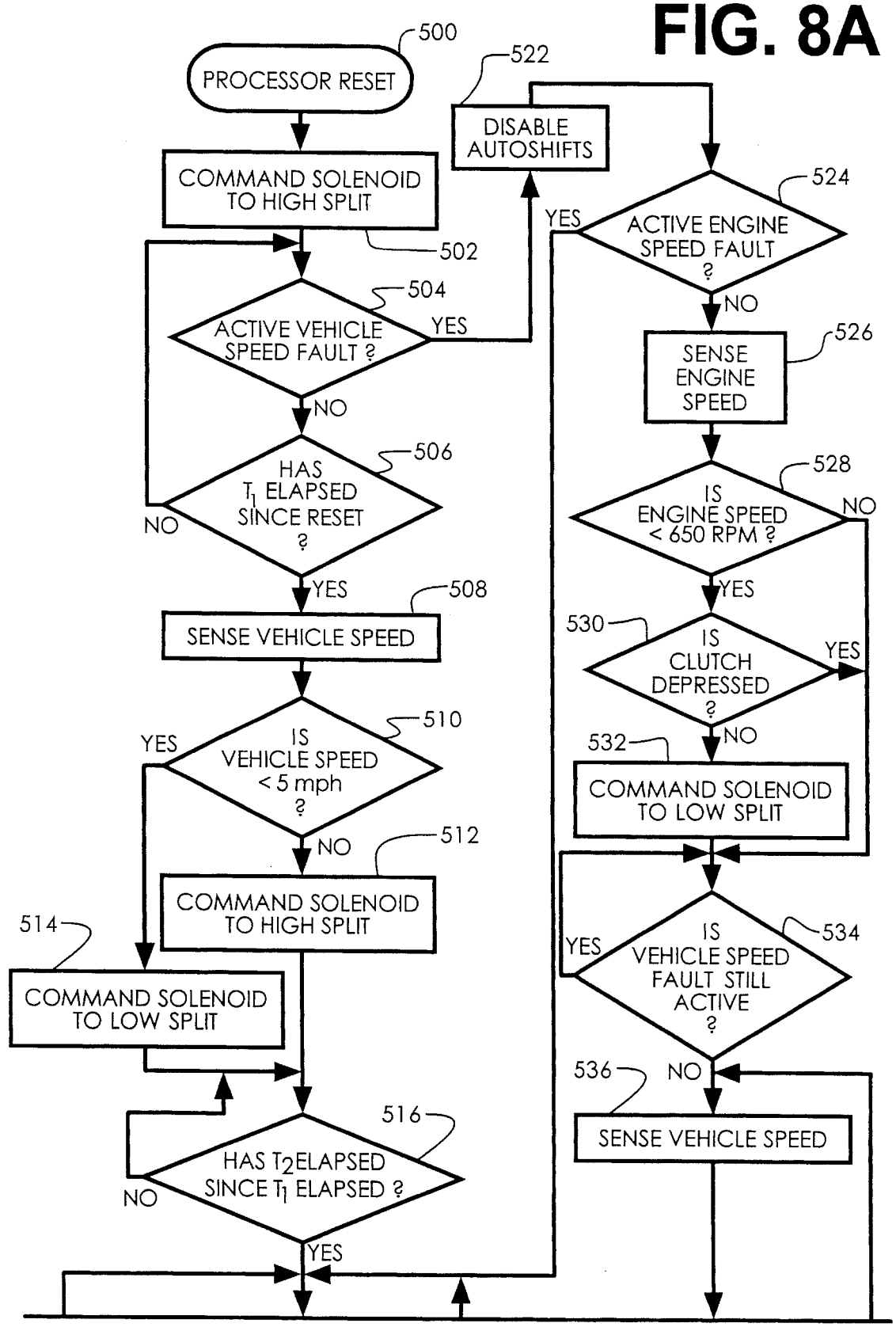
FIG. 8 is composed of FIGS. 8A and 8B and describes another embodiment of a flowchart of an algorithm for commanding a gear after a power reset, in accordance with the present invention, in controlling the transmission embodiment of FIG. 3.
Figure 8B:
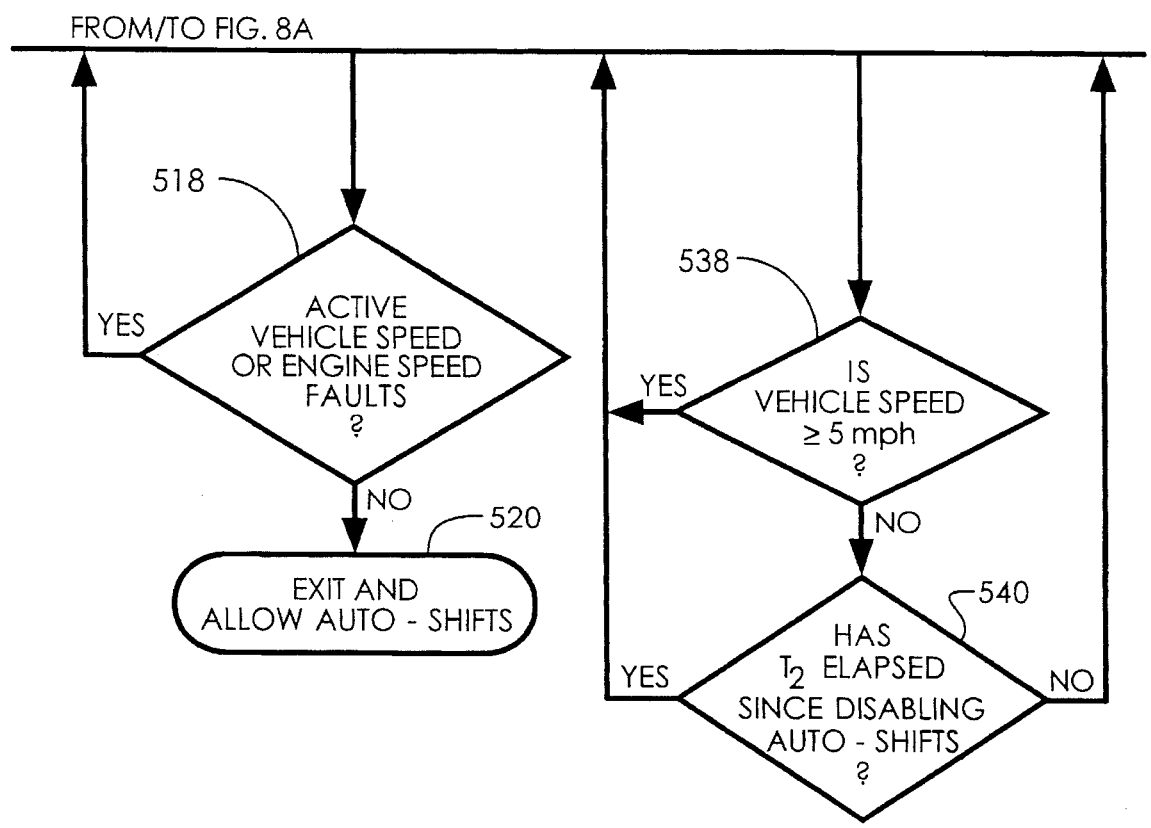

Referring now to FIGS. 8A and 8B, a flowchart for an alternative algorithm for controlling recovery after a power reset, in accordance with the present invention, is shown. The algorithm of FIGS. 8A and 8B implements concepts described herein via ECM 20 and is preferably used in controlling, for example, MAT 70 after a power reset. The algorithm begins at step 500 with a power reset. The power reset may occur due to any of a number of events as previously discussed with respect to the flowcharts of FIGS. 7A–7C. After a power reset occurs, the highest of the electronically selectable gears (high split) is commanded at step 502. Typically, step 502 is executed within approximately 100 milliseconds of the power reset, although the present invention contemplates executing step 502 within the range of approximately 1 millisecond and 1000 milliseconds of the power reset.

The algorithm continues at step 504 where the vehicle speed fault status is tested. If a vehicle speed fault is detected as being active at step 504, the algorithm continues at step 522. If a vehicle speed signal is detected as being inactive at step 504, the algorithm continues at step 506. If, at step 506, a time period $T_1$ has elapsed since the power reset occurred at step 500, the algorithm continues at step 508. If $T_1$ has not elapsed since the power reset, the algorithm loops back to step 504. Thus, for a time period $T_1$ after a power reset, the present algorithm maintains the high split and inhibits further electronically controlled shifts while monitoring the vehicle speed fault status. As with the algorithm of FIGS. 7A–7C, $T_1$ is typically set at approximately 1.7 seconds, although the present invention contemplates $T_1$ values of between approximately 1 millisecond and 10 seconds.

After the time period $T_1$ has elapsed since the power reset occurred, the vehicle speed is sensed at step 508. As with the algorithm of FIGS. 7A–7C, the time period $T_1$ is an important aspect of the present invention in that it allows a time delay after the occurrence of a power reset for the ECM 20 to determine an accurate vehicle speed. If the vehicle speed sensed at step 508 is less than a minimum vehicle speed value (typically 5 mph) at step 510, ECM 20 commands the lowest of the electronically selectable gears (low split) at step 514. If the vehicle speed is greater than or equal to the minimum vehicle speed value at step 510, ECM 20 commands the highest of the electronically selectable gears (high split) at step 512. Typically, the minimum vehicle speed value is set at approximately 5 miles per hour, although the present invention contemplates minimum vehicle speed values of between 1 mile per hour and 50 miles per hour. Thus, after a time delay of $T_1$ (typically 1.7 seconds), the lowest of the electronically selectable gears (low split) is commanded if the vehicle speed is less than a minimum vehicle speed value (typically 5 mph), and the highest of the electronically selectable gears (high split) is commanded if the vehicle speed is greater than or equal to the minimum vehicle speed value.

After either of steps 512 or 514, program execution continues at step 516. If, at step 516, the time period $T_2$ has elapsed since $T_1$ elapsed, the algorithm continues at step 518 where the vehicle speed and engine speed fault statuses are tested. If either a vehicle speed or engine speed fault is active at step 518, the algorithm loops back to step 518 continuously until both fault conditions are cleared. From step 518, program execution continues at step 520 where the algorithm is exited (or alternatively returned to its calling routine) and further electronic shifts are thereafter allowed. As with the algorithm of FIGS. 7A–7C, $T_2$ is typically set at approximately 3.5 seconds, although the present invention contemplates using $T_2$ values of between 10 milliseconds and 10 seconds.

If, at step 504, a vehicle speed fault is detected as being active, the algorithm continues at step 522 where all auto shifts are disabled. Thereafter, the engine speed fault status is tested at step 514. If any engine speed faults are active at step 524, the algorithm continues at step 518. If no engine speed faults are active at step 524, the engine speed is sensed at step 526. If the engine speed is thereafter determined to be greater than or equal to a minimum engine speed value at step 528, the algorithm continues at step 534. If, at step 528, the engine speed sensed at step 526 is below the minimum engine speed value, the algorithm continues at step 530. Typically, the minimum engine speed value is set at approximately 650 RPM, although the present invention contemplates minimum engine speed values of between approximately 50 RPM and 1500 RPM.

At step 530, the status of the clutch pedal 36 (FIG. 1) is tested. If, at step 530, the clutch pedal 36 is detected as having been depressed such that the clutch is engaged, the algorithm continues at step 534. If, at step 530, the clutch pedal 36 is not depressed, the lowest of the electronically selectable gears (low split) is commanded at step 532. If low split is commanded at step 532, if the clutch pedal was detected as having been depressed at step 530, or if the engine speed sensed at step 526 was greater than or equal to the minimum engine speed value at step 528, the vehicle speed fault status is again tested at step 534.

If, at step 534, the vehicle speed fault status has not yet been cleared, the algorithm continually loops back to step 534 until the fault is cleared (becomes inactive). Once the vehicle speed fault is detected as being inactive at step 534, the vehicle speed is sensed at step 536 and thereafter tested at step 538. If, at step 538, the vehicle speed sensed at step 536 is greater than or equal to the minimum vehicle speed value, the algorithm continues at step 518. If, at step 538, the vehicle speed is less than the minimum vehicle speed value, the algorithm continues at step 540 where the status of the time period $T_2$ is tested. If, at step 540, $T_2$ has not elapsed since auto shifts were disabled at step 522, the algorithm loops back to step 536 to sense the vehicle speed. If, at step 540, $T_2$ has elapsed since auto shifts were disabled at step 522, the algorithm continues at step 518. Thus, if a vehicle speed fault is detected as being active prior to $T_1$ elapsing, then low split is commanded if the engine speed is less than a minimum engine speed value and the clutch pedal had not been depressed so as to engage the clutch. Once the fault has been cleared, the vehicle speed is continuously monitored and the algorithm is exited if the vehicle achieves a speed of at least the minimum vehicle speed value before the time period $T_2$ expires and no further vehicle speed or engine faults exist.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of electronically controlling a manual/automatic transmission after an electrical power reset in a vehicle having an engine engageable to the transmission and means for sensing vehicle speed, the transmission including both manually and electronically selectable gears and an electronically selectable neutral position, the method comprising the steps of:

(1) maintaining engagement of the gear commanded prior to the power reset for a first predetermined time period;
   (2) performing steps (3)–(7) after said first predetermined time period elapses;
   (3) sensing vehicle speed;
   (4) commanding neutral position if said vehicle speed is less than a first predetermined vehicle speed;
   (5) commanding the highest of the electronically selectable gears if said vehicle speed is above a second predetermined vehicle speed and the engine is not engaged to either of the two highest electronically selectable gears;
   (6) sensing vehicle speed; and
   (7) performing steps (5)–(6) until a second predetermined time period elapses.

2. The method of claim 1 wherein the vehicle further includes an electronic controller for controlling the transmission and engine, and wherein the controller includes means for detecting fault conditions associated with the means for sensing vehicle speed and providing a vehicle speed fault status corresponding thereto, and further wherein step (2) is conditioned upon the vehicle speed fault status being inactive.

3. The method of claim 2 wherein the vehicle further includes means for sensing engine speed and providing an engine speed signal to the controller corresponding thereto, and wherein the controller includes means for detecting fault conditions associated with the means for sensing engine speed and providing an engine speed fault status corresponding thereto, and further wherein step (2) is further conditioned upon the engine speed fault status being inactive.

4. The method of claim 3 wherein step (5) is further conditioned upon the engine speed signal being received by the controller.

5. The method of claim 4 wherein the transmission further includes at least one solenoid associated therewith for actuating the engagement of any of the electronically selectable gears, and wherein the controller includes means for detecting fault conditions associated with each of the solenoids and providing a solenoid fault status corresponding thereto, and further wherein step (2) is further conditioned upon the solenoid fault status being inactive.

6. The method of claim 2 wherein the transmission includes an automatic gear status indicator indicating whether one of the electronically selectable gears may be commanded, and wherein the method further includes the steps of:

(8) performing step (9) if the vehicle speed fault status is active; and (9) commanding the highest of the electronically selectable gears if the transmission is in the neutral position and the automatic gear status indicates that one of the electronically selectable gears may be commanded.

7. The method of claim 6 wherein step (8) further includes performing step (10), and wherein the method further including the step of:

(10) inhibiting further electronic gear shifts until the vehicle fault status becomes inactive.

8. The method of claim 3 further including the steps of:

(8) performing steps (9)–(11) after said first predetermined time period has elapsed if the engine speed fault status is active;

(9) sensing vehicle speed;

(10) commanding neutral position if said vehicle speed is less than a first predetermined vehicle speed; and

(11) commanding the highest of the electronically selectable gears if said vehicle speed is above a second predetermined vehicle speed and the transmission is in the neutral position.

9. The method of claim 8 wherein step (7) further includes performing step (12), and wherein the method further includes the step of:

(12) inhibiting further electronic gear shifts until the engine speed fault becomes inactive.

10. The method of claim 5 further including the steps of:

(8) performing step (9) after said first predetermined time period elapses if the solenoid fault status is active; and (9) inhibiting further electronic gear shifts until the solenoid fault status becomes inactive.

11. The method of claim 1 wherein said first predetermined time period is between approximately 1 millisecond and 5 seconds.

12. The method of claim 11 wherein said second predetermined time period is between approximately 10 milliseconds and 10 seconds.

13. The method of claim 1 wherein said first predetermined vehicle speed is between approximately 1 mile per hour and 50 miles per hour.

14. The method of claim 13 wherein said second predetermined vehicle speed is between approximately 1 mile per hour and 100 miles per hour.

15. A method of electronically controlling a manual/automatic transmission after an electrical power reset in a vehicle having an engine engageable to the transmission and means for sensing vehicle speed, the transmission including both manually and electronically selectable gears and an electronically selectable neutral position, the method comprising the steps of:

(1) commanding the highest of the electronically selectable transmission gears;

(2) maintaining the transmission gear commanded in step (1) for a first predetermined time period;

(3) performing steps (4)–(7) after said first predetermined time period elapses;

(4) sensing vehicle speed;

(5) commanding the lowest of the electronically selectable gears if said vehicle speed is less than a predetermined vehicle speed;

(6) commanding the highest of the electronically selectable gears if said vehicle speed is above said predetermined vehicle speed; and (7) inhibiting auto electronic shifts until a second predetermined time period elapses.

16. The method of claim 15 wherein the vehicle further includes an electronic controller for controlling the transmission and engine, and wherein the controller includes means for detecting fault conditions associated with the means for sensing vehicle speed and providing a vehicle speed fault status corresponding thereto, and further wherein step (2) is conditioned upon the vehicle speed fault status being inactive.

17. The method of claim 16 wherein the vehicle further includes an engine speed sensor for sensing engine speed, and wherein the controller includes means for detecting fault conditions associated with the means for sensing engine speed and providing an engine speed fault status corresponding thereto, the method further including the steps of:

(9) performing steps (10)–(12) if the vehicle speed fault status is active;

(10) performing steps (11)–(12) if an engine speed fault is active;

(11) sensing engine speed; and

(12) commanding the lowest of the electronically selectable gears if said engine speed is less than a predetermined engine speed.

18. The method of claim 17 wherein the vehicle further includes a clutch, and wherein the controller includes means for determining whether the clutch is activated, and wherein step (12) is further conditioned upon the clutch not being activated.

19. The method of claim 18 wherein step (9) further includes performing steps (13)–(16), and wherein the method further includes the steps of:

(13) maintaining engagement of the most recent gear commanded until the vehicle speed fault status becomes inactive;

(14) sensing vehicle speed;

(15) inhibiting further electronic gear shifts unless the most recently sensed vehicle speed is less than said predetermined vehicle speed and said second predetermined time period has not elapsed; and

(16) performing steps (13)–(14) until said second predetermined time period elapses.

20. The method of claim 15 wherein said first predetermined time period is between approximately 1 millisecond and 10 seconds.

21. The method of claim 20 wherein aid second predetermined time period is between approximately 10 milliseconds and 10 seconds.

22. The method of claim 15 wherein said predetermined vehicle speed is between approximately 1 mile per hour and 50 miles per hour.

23. The method of claim 17 wherein said predetermined engine speed is between approximately 50 RPM and 1500 RPM.

24. A control device for use with a motor vehicle having an engine and a manual/automatic transmission including a gear selection input and further having a manual gear selection mode of operation and an automatic gear shift mode of operation including a plurality of electronically selectable gears and a neutral position, said device comprising:

means for sensing vehicle speed and providing a vehicle speed signal corresponding thereto;

means for sensing engine speed and providing an engine speed signal corresponding thereto; and processor means for controlling the transmission after a power reset, said processor means having a first input for receiving said vehicle speed signal, a second input for receiving said engine speed signal and an output connected to the gear selection input;

wherein said processor means is responsive to said power reset to provide a gear selection signal to the gear selection input to maintain engagement of the gear commanded prior to the occurrence of said power reset;

and wherein said processor means is responsive to said vehicle speed signal, after a first predetermined time period has elapsed since the power reset, to provide a gear selection signal to the gear selection input to command one of, the neutral position if said vehicle speed is less than a first predetermined vehicle speed; and the highest of the electronically selectable gears if a vehicle speed in excess of a second predetermined vehicle speed level is detected before a second predetermined time period elapses and if the ratio of said engine speed to said vehicle speed is within a predetermined range.

25. The control device of claim 24 wherein said processor means includes means for detecting fault conditions associated with said means for sensing vehicle speed and providing a vehicle speed fault status signal corresponding thereto, and wherein said processor provides said gear selection signal only if said vehicle speed fault status signal indicates an inactive vehicle speed fault.

26. The control device of claim 25 wherein said processor means includes means for detecting fault conditions associated with said means for sensing engine speed and providing an engine speed fault status signal corresponding thereto, and wherein said processor provides said gear selection signal after said first predetermined time period only if said engine speed fault status signal indicates an inactive engine speed fault.

27. The control device of claim 26 wherein the transmission includes at least one solenoid associated therewith for for actuating the engagement of any of the electronically selectable gears, and wherein said processor means includes means for detecting fault conditions associated with said solenoid and providing a solenoid fault status signal corresponding thereto, and wherein said processor provides said gear selection signal after said first predetermined time period only if said solenoid fault status signal indicates an inactive solenoid fault.

28. The control device of claim 25 wherein the transmission further includes a gear position feedback indicator for providing a gear position signal to said processor means indicating whether the engine is engaged to one of the electronically selectable transmission gears, and wherein said processor means has a third input for receiving said gear position signal, and further wherein said processor means is responsive to said gear position signal and to said vehicle speed fault signal to provide a gear selection signal to the gear selection input to command the highest of the electronically selectable gears if said vehicle speed fault status signal indicates an active vehicle speed fault and if said gear position signal indicates that the transmission is in the neutral position.

29. The control device of claim 28 wherein the transmission further includes a top gear indicator for providing an automatic gear signal to said processor means indicating whether any of the electronically selectable transmission gears may be requested, and wherein said processor means has a fourth input for receiving said automatic gear signal, and further wherein said processor means is further responsive to said automatic gear signal to command the highest of the electronically selectable gears if said vehicle speed fault status signal indicates an active vehicle speed fault and if said automatic gear signal indicates that any of the electronically selectable gears may be commanded.

30. A control device for use with a motor vehicle having an engine and a manual/automatic transmission including a gear selection input and further having a manual gear selection mode of operation and an automatic gear shift mode of operation including a plurality of electronically selectable gears and a neutral position, said device comprising:

means for sensing vehicle speed and providing a vehicle speed signal corresponding thereto; and processor means for controlling the transmission after a power reset, said processor means having a first input for receiving said vehicle speed signal and an output connected to the gear selection input;

wherein said processor means is responsive to the power reset to provide a signal to the gear selection input to command the highest of the electronically selectable gears;

and wherein said processor means is responsive to said vehicle speed signal, after a first predetermined time period has elapsed since the power reset, to provide a signal to the gear selection input to command one of, the lowest of the electronically selectable gears if said vehicle speed is less than a predetermined vehicle speed; and the highest of the electronically selectable gears ifs aid vehicle speed is in excess of said predetermined vehicle speed level.

31. The control device of claim 30 wherein said processor means includes means for detecting fault conditions associated with said means for sensing vehicle speed and providing a vehicle speed fault status signal corresponding thereto, and wherein said processor provides said gear selection signal after said first predetermined time period only if said vehicle speed fault status signal indicates an inactive vehicle speed fault.

32. The control device of claim 31 wherein said device further includes means for sensing engine speed and providing an engine speed signal corresponding thereto, and wherein said processor means includes means for detecting fault conditions associated with said means for sensing engine speed and providing an engine speed fault status signal corresponding thereto, and wherein the vehicle further includes a clutch, and wherein said device includes means for detecting whether said clutch is engaged and providing a clutch signal corresponding thereto, and wherein said processor means has a second input for receiving said clutch signal, and further wherein said processor means is responsive to said engine speed signal, to said clutch signal and to said vehicle speed fault signal to provide a gear selection signal to the gear selection input to command the lowest of the electronically selectable gears if said vehicle speed fault status signal indicates an active vehicle speed fault, if said engine speed is below a predetermined engine speed, and if said clutch signal indicates that the clutch is disengaged.

* * * * *